(12) United States Patent
Bian et al.

(10) Patent No.: US 11,892,094 B2
(45) Date of Patent: Feb. 6, 2024

(54) VALVE ARRANGEMENT

(71) Applicant: Neoperl GmbH, Mullheim (DE)

(72) Inventors: Yichao Bian, Mullheim-Hugelheim (DE); Marc Tempel, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 17/679,269

(22) Filed: Feb. 24, 2022

(65) Prior Publication Data

US 2022/0178460 A1 Jun. 9, 2022

Related U.S. Application Data

(63) Continuation-in-part of application No. 16/638,331, filed as application No. PCT/EP2018/065574 on Jun. 13, 2018, now Pat. No. 11,287,052.

(30) Foreign Application Priority Data

Sep. 7, 2017 (DE) .......................... 202017105426.8

(51) Int. Cl.
*F16K 27/02* (2006.01)
*F16K 31/365* (2006.01)
*F16K 7/17* (2006.01)

(52) U.S. Cl.
CPC .............. *F16K 31/365* (2013.01); *F16K 7/17* (2013.01); *F16K 27/0236* (2013.01)

(58) Field of Classification Search
CPC ...... F16K 31/365; F16K 27/0236; F16K 7/17; F16K 27/02
See application file for complete search history.

(56) References Cited

U.S. PATENT DOCUMENTS

| 202,653 A | 4/1878 | Hogan |
| 1,764,790 A | 6/1930 | Hook |

(Continued)

FOREIGN PATENT DOCUMENTS

| CN | 87202979 | 1/1988 |
| CN | 1414272 | 4/2003 |

(Continued)

OTHER PUBLICATIONS

US 5,938,171 A, 08/1999, Keller (withdrawn)

*Primary Examiner* — Umashankar Venkatesan
(74) *Attorney, Agent, or Firm* — Volpe Koenig

(57) ABSTRACT

A valve arrangement having a main valve and having a pilot valve which is provided for controlling the main valve and which is inserted into a pilot valve receptacle in an insertion direction, wherein, through closure of the pilot valve, a pressure is able to be built up within a pressure chamber which is closed off by a diaphragm, whereby a valve seat between a main valve inlet and a main valve outlet is able to be closed off. By opening the pilot valve, it is possible to set a release of pressure within the pressure chamber by water flowing away via an inflow, connected to the pressure chamber, of the pilot valve receptacle and via a pilot valve inlet, adjoining the latter and formed by a main body of the pilot valve. A pilot valve outlet, formed by the main body, and via an outflow, adjoining said pilot valve outlet, into the main valve outlet, opens into the main valve outlet on the outflow side of the diaphragm. The pilot valve inlet and the pilot valve outlet are arranged offset from one another along a longitudinal axis of the pilot valve.

20 Claims, 7 Drawing Sheets

(56) References Cited

U.S. PATENT DOCUMENTS

| | | | |
|---|---|---|---|
| 2,180,320 A * | 11/1939 | Hansen | F16K 31/385 |
| | | | 137/635 |
| 2,417,994 A | 3/1947 | Sheets | |
| 3,022,039 A | 2/1962 | Cone | |
| 3,367,621 A | 2/1968 | Griswold | |
| 4,081,171 A * | 3/1978 | Morgan | B01D 29/70 |
| | | | 251/30.02 |
| 4,135,696 A | 1/1979 | Sareem | |
| 4,245,813 A | 1/1981 | Grenier | |
| 4,715,578 A | 12/1987 | Seltzer | |
| 5,213,303 A | 5/1993 | Walter | |
| 6,345,806 B1 | 2/2002 | Chen et al. | |
| 7,296,593 B2 * | 11/2007 | Matsui | F16K 31/128 |
| | | | 251/38 |
| 11,287,052 B2 * | 3/2022 | Bian | F16K 31/385 |
| 2002/0046774 A1 | 4/2002 | Keller | |
| 2005/0016598 A1 | 1/2005 | Frindt | |
| 2013/0341541 A1 | 12/2013 | Boticki | |
| 2019/0072204 A1 | 3/2019 | Galeazzi | |

FOREIGN PATENT DOCUMENTS

| | | | |
|---|---|---|---|
| CN | 101280856 A * | 10/2008 | |
| CN | 201344281 | 11/2009 | |
| CN | 202432012 | 9/2012 | |
| CN | 202646772 | 1/2013 | |
| CN | 203926960 | 11/2014 | |
| CN | 106090413 | 11/2016 | |
| CN | 106763812 A * | 5/2017 | |
| CN | 109469764 | 3/2019 | |
| DE | 2321102 | 11/1974 | |
| EP | 2982890 | 2/2016 | |
| GB | 796013 | 6/1958 | |
| IN | 207989868 | 10/2018 | |
| JP | 2003202084 | 7/2003 | |
| JP | 2007187187 | 7/2007 | |
| WO | 9705416 | 2/1997 | |

* cited by examiner

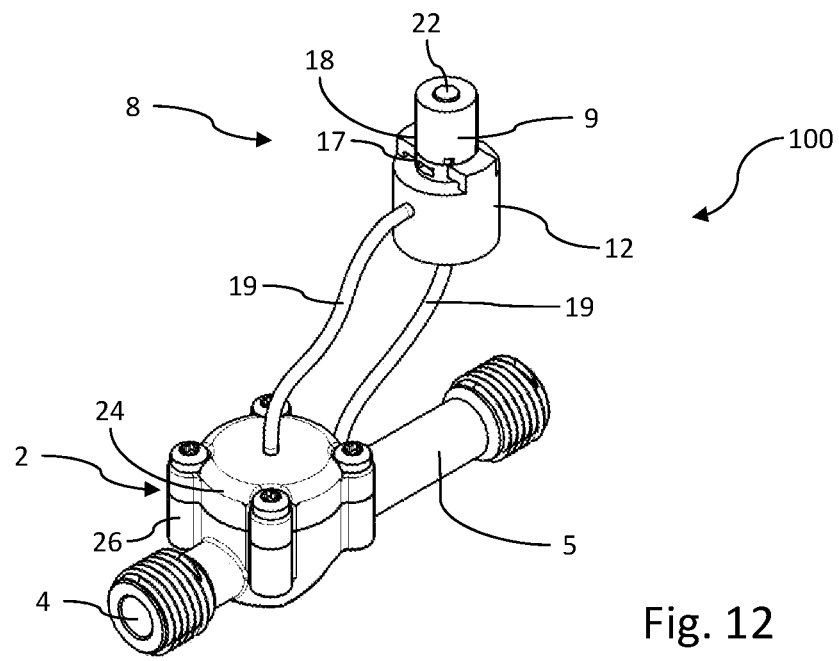
Fig. 12
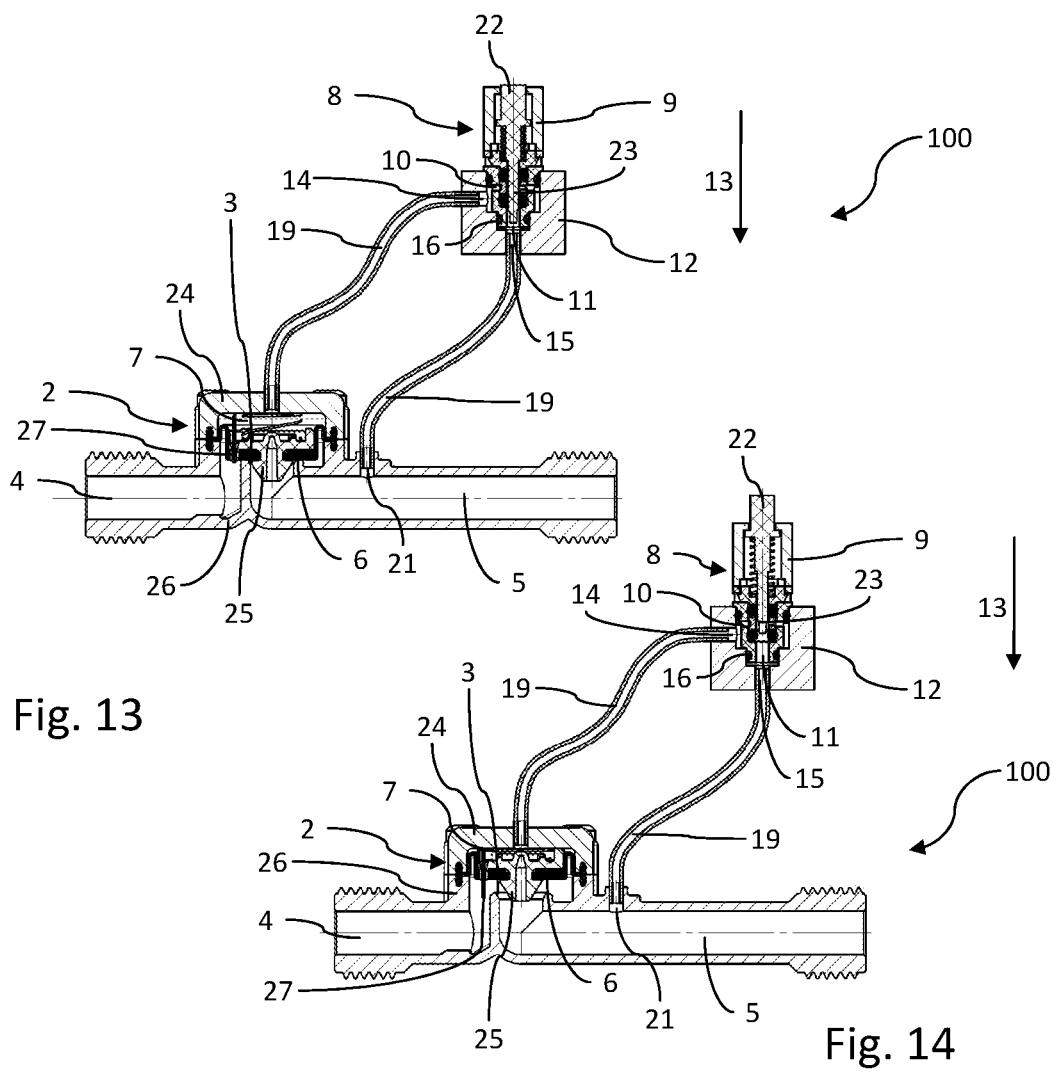
Fig. 13
Fig. 14

VALVE ARRANGEMENT

INCORPORATION BY REFERENCE

The following documents are incorporated herein by reference as if fully set forth: U.S. application Ser. No. 16/638,331, filed Feb. 11, 2020; International Application No. PCT/EP2018/065574, filed Jun. 13, 2018; and German Patent Application No. 20 2017 105 426.8, filed Sep. 7, 2017.

TECHNICAL FIELD

The invention relates to a valve arrangement having a main valve which has a diaphragm which selectively closes off and opens up a valve seat between a main valve inlet and a main valve outlet and has a pressure chamber which is closed off by the diaphragm and by way of which the diaphragm is able to be switched by way of application of pressure, and having a pilot valve by way of which it is possible to control a release of pressure of the pressure chamber into the main valve outlet of the main valve, wherein the pilot valve has a main body on which a pilot valve inlet and a pilot valve outlet are formed, wherein the pilot valve inlet is, via the pilot valve, selectively connectable to the pilot valve outlet and separable therefrom, and the main body is inserted into a pilot valve receptacle in an insertion direction, wherein the pilot valve receptacle has an inflow corresponding to the pilot valve inlet and has an outflow corresponding to the pilot valve outlet, wherein the inflow is connected to the pressure chamber and the outflow opens into the main valve outlet on the outflow side of the diaphragm.

BACKGROUND

Such a valve arrangement has in particular the disadvantage that, in the case of different embodiments of previously known valve arrangements, the pilot valve also has to be designed in a manner differently and individually adapted to the respective embodiment. It is thus not possible for only one, in particular structurally identical, pilot valve to be provided in the case of different embodiments of valve arrangements. The possibility of using a structurally identical pilot valve would consequently result in an enormous saving potential with the production of valve arrangements of the type mentioned at the beginning being provided.

Different embodiments may include for example those in which an adjustment direction of the main and pilot valves are oriented parallel or inclined, in particular perpendicular, to one another. Expressed in general terms, it is thus possible to include valve arrangements in which a different insertion direction for inserting the pilot valve is provided.

Here, it would be desirable if, for different embodiments, it would be possible to insert a pilot valve produced in a structurally identical manner, in order for the production costs to be reduced overall.

There is an associated problem in this case particularly with regard to a coupling point between the main body of the pilot valve and the pilot valve receptacle. Generally, a reliably sealed and stable connection of the main body and of the pilot body is achievable only in that said two components are connected fixedly to one another and, consequently, are either not able to be released from one another at all or are able to be released from one another only by means of a tool. For example, the main body of the pilot valve may be screwed fixedly to the pilot receptacle. This may be necessary since the pilot valve inserted with the main body into the pilot valve receptacle has to be sealed at the coupling point axially with respect to the pilot valve receptacle, in order to avoid leakage between the two components.

Conversely, in the case of an insufficiently stable coupling of the main body to the pilot valve receptacle, it may occur that the seal, generally in the form of an axial seal, between the pilot valve inlet and the inflow, and between the pilot valve outlet and the outflow, is insufficient and water damage to components surrounding the valve arrangement, such as fittings, may consequently occur in the long term due to leakage.

SUMMARY

The invention is therefore based on the object of providing a valve arrangement of the type stated in the introduction in which the above-stated disadvantages are eliminated.

For the purpose of achieving this object, a valve arrangement with one or more features according to the invention is provided. In particular, according to the invention, for the purpose of achieving the stated object, it is proposed that the pilot valve inlet and the pilot valve outlet are arranged offset from one another at least in the insertion direction. It is thus possible for the positions of the pilot valve inlet and pilot valve outlet to be transferable into one another by way of a displacement, possibly superimposed by a rotation which is, with respect to the insertion direction, radial and/or oriented in the circumferential direction. Thus, in comparison with previously known valve arrangements of the type stated in the introduction, it is possible to achieve simpler and still reliable sealing between the main body of the pilot valve and the pilot valve receptacle. Due to the arrangement of the pilot valve inlet and the pilot valve outlet that is offset in the insertion direction, it is possible to set up a special water guide, whereby, when the valve arrangement is used, contact pressure of the pilot valve against the pilot valve receptacle of a magnitude as in previously known valve arrangements of the type stated in the introduction is not necessary for preventing leakage. It is thus possible for example to completely dispense with a screw connection or a similarly fixed connection, by way of which, in the case of already known valve arrangements, a contact pressure of the pilot valve on the pilot valve receptacle is able to be generated. A further advantage is that the pilot valve is always able to be designed in a structurally identical manner regardless of its orientation relative to the main valve. In this way, the production costs of different embodiments of the valve arrangement according to the invention can be significantly reduced, since it is not the case that multiple different pilot valves adapted to the respective embodiment have to be produced, but rather that the pilot valve can be reused in different installation variants. The invention also allows reduction of installation space transverse to the insertion direction, since the inflow and the outflow are able to be arranged one behind the other in the insertion direction.

According to an advantageous refinement of the invention, it may be provided that, at least in the position of use, between the pilot valve inlet and the pilot valve outlet, there is arranged a sealing element acting transversely to the insertion direction, in particular a seal ring acting transversely to the insertion direction. Due to the particular construction of the pilot valve and of the pilot valve receptacle, it is possible to dispense with axial seals, with which a significantly greater contact pressure between the pilot valve and the pilot valve receptacle is required than with a sealing element acting transversely to the insertion direction. Preferably, the sealing element is arranged on the main body.

Alternatively or additionally, it may furthermore be advantageous if, by way of a sealing element or the sealing element stated above, in particular the seal ring, a radial seal between the pilot valve inlet and the pilot valve outlet, in particular between the main body and the pilot valve receptacle, is formed. The formation of a radial seal makes it possible to prevent leakage between the pilot valve inlet and the pilot valve outlet. At the same time, a coupling point between the pilot valve and the pilot valve receptacle may be designed such that a slight displacement of the main body of the pilot valve within the pilot valve receptacle and relative to the pilot valve receptacle is able to be tolerated owing to play between the two components. The coupling may consequently be designed such that it is possible to prevent the pilot valve sliding out of the pilot valve receptacle. By way of the coupling, it is consequently not necessary for contact pressure of the pilot valve against the pilot valve receptacle to be generated.

According to a further advantageous refinement of the invention, it may be provided that the inflow and/or the outflow are/is oriented transverse to the insertion direction, and/or in that the pilot valve inlet and/or the pilot valve outlet are/is oriented transverse to the insertion direction. Due to the different possibilities for the orientation of the inflow and the outflow and/or, preferably in a corresponding manner, of the pilot valve inlet and the pilot valve outlet, a particularly wide variety of different embodiments can be achieved, wherein the basic construction according to the invention can remain unchanged.

In order to design an inexpensive and still reliable coupling of the pilot valve to the pilot valve receptacle that is releasable without tools, it may be advantageous if a fastening means is formed on the main body and a mating fastening means is formed on the pilot valve receptacle, which fastening means form a lockable and releasable connection. For example, it may be provided that the releasable connection is in the form of a plug-and-turn connection, preferably in the form of a bayonet connection. In this way, simple decoupling of the pilot valve from the pilot valve receptacle is possible. In the event of a defect, the pilot valve and/or the main valve are/is consequently able to replaced individually.

According to a further advantageous refinement of the invention, it may be provided that the connection between the inflow and the pressure chamber and/or the connection between the outflow and the main valve outlet are/is realized via a tube connection. This has the advantage that the valve receptacle is able to be positioned more or less freely relative to the main valve, in particular relative to the housing of the main valve. In particular, the pilot valve is able to be arranged so as to be further spaced apart from the main valve. A tube connection also has the advantage that the length thereof is able to be easily adapted to the installation situation, for example by cutting off a tube piece, and/or that the tube connection is flexible. This allows the tube connection to be freely bendable, which facilitates the installation of the valve arrangement, in particular since it is possible for the pilot valve receptacle to be spaced apart from the main valve.

In order to be able to form a particularly reliable seal between the pilot valve and the pilot valve receptacle in the region between the pilot valve inlet and the pilot valve outlet, it may be expedient if the pilot valve inlet and the pilot valve outlet are arranged spaced apart from one another in the insertion direction. This makes it possible for a sealing element, such as for example a seal ring or the seal ring already stated above, to be arranged in this region between the pilot valve inlet and the pilot valve outlet.

According to a further advantageous refinement of the valve arrangement, it may be provided that the pilot valve inlet is formed on the main body as a duct extending radially at least sectionally, for example in a mouth region, and/or the pilot valve outlet is formed on the main body as a duct extending axially at least sectionally, for example in a mouth region. In the position of use of the pilot valve, it is thus possible for a release of pressure of a holding means, by which the pilot valve is held in the pilot valve receptacle, to be achieved. In this case, use is made of the realization that the outflow is substantially unpressurized.

According to a preferred refinement of the valve arrangement, it may be expedient if the pilot valve receptacle is formed in a housing part of the main valve. In this way, a highly compact configuration of the valve arrangement is able to be achieved. Preferably, the housing part is designed as an adapter which is able to be removed from the remainder of the housing. This allows the orientation of the pilot valve relative to the main valve to be changed by simple exchange of the adapter.

According to a further advantageous refinement, it may be provided that the pilot valve receptacle is of pot-shaped form. Here, it may be particularly advantageous if the pilot valve receptacle is designed to be at least half as deep as it is wide, preferably at least as deep as it is wide or even at least twice as deep as it is wide. This allows the pilot valve to be arranged in a stable manner, in particular without additional lateral stabilization elements, in the pilot valve receptacle. In this context, pot-shaped may mean for example that the pilot valve receptacle has a receiving space which may be delimited by a base and by a for example cylindrical or stepped cylindrical lateral wall. In particular, said receiving space may be at least partially of cylindrical and/or frustoconical and/or rectangular and/or square form.

According to a further advantageous refinement, it may be provided that the outflow is formed at an inner end region of the pilot valve receptacle. In this case, the pilot valve outlet is oriented axially and/or in the insertion direction. In this way, the invention permits a particularly space-saving configuration of the pilot valve receptacle and the pilot valve. Furthermore, this makes possible a release of pressure of a holding means for the pilot valve at the pilot valve receptacle.

According to a further advantageous refinement of the valve arrangement, it may be provided that a mouth opening of the connection between the outflow and the main valve outlet is arranged spaced apart from the diaphragm of the main valve. This allows the pilot valve to be coupled to the main valve regardless of how the main valve is designed. In particular, no adaptation of the pressure chamber, and/or of the diaphragm, in terms of construction is necessary.

It may be advantageous if the pilot valve is able to be actuated by hand. This makes it possible for the valve arrangement to be operated by the user in a simple manner.

Here, it may be particularly advantageous if, for the purpose of actuation, the pilot valve has a pushbutton mechanism, a rocker switch and/or a rotary switch. This makes possible simple opening and closing of the main valve more or less independently of a pressure prevailing in the pressure chamber of the main valve via the pilot valve.

A particularly preferred refinement of the valve arrangement may provide that the pilot valve has a valve plunger. Through adjustment of the valve plunger between an open position and a closed position, in which closed position the valve plunger is preferably inserted into a valve seat, it is possible to regulate a throughflow through the pilot valve in a simple and efficient manner. In a release position of the valve plunger, water can flow from the pilot valve inlet into the pilot valve outlet through the pilot valve. In said release position, the main valve is likewise in an open position. In the closure position of the valve plunger of the pilot valve, no throughflow through the pilot valve takes place and, consequently, a pressure is built up within the pressure chamber of the main valve. This results in a valve body of the main valve being pressed into the valve seat and the main valve thereby being closed.

According to a further advantageous refinement of the valve arrangement, it may be provided that the pilot valve is in the form of a pinch valve. A pinch valve makes it possible to achieve an optimum shut-off, with the production costs being relatively low.

It may be particularly expedient if the pilot valve is fastened releasably, in particular is fastened releasably by a bayonet connection, in the pilot valve receptacle. This makes it possible for the pilot valve to be separated from the pilot valve receptacle without tools. The design of the pilot valve receptacle in pot-shaped form and/or the formation of radial sealing rings can provide the required play for closing the bayonet closure.

For the purpose of achieving the object, the invention furthermore relates to a series of valve arrangements according to the additional embodiments having at least two variants, which each form a valve arrangement as described and claimed herein. In particular, according to the invention, for the purpose of achieving the object, it is proposed that the pilot valves of the at least two variants are structurally identical, wherein, in a first variant of the at least two variants, the pilot valve is arranged in a pilot valve receptacle formed on a housing part of the main valve and, in a second variant of the at least two variants, the pilot valve is arranged in a position, and/or with an orientation, which differs in relation to the respective main valve. In this way, the user is able to select the valve arrangement as required according to an installation situation. This gives the user significantly greater flexibility, since it is not necessary to clarify which installation variant is usable, and which installation variant is not usable, prior to the installation of a valve arrangement. At least one of the valve arrangements included in the series is suitable for the respective conditions, and/or matched thereto.

According to an advantageous refinement of the series, it may be provided that, in the second variant of the at least two variants, the pilot valve is arranged in a pilot valve receptacle which is separate from the main valve. This makes it possible for the pilot valve to be arrangeable more or less independently of the main valve. In particular, the pilot valve is able to be arranged spaced apart from the main valve.

According to a preferred configuration of the series, it may be particularly advantageous if, in the second variant, the pilot valve is connected to the main valve via at least one tube connection. A tube connection has the advantage that the length thereof is able to be easily adapted to the installation situation, for example by cutting off a tube piece, and/or that the tube connection is flexible. This makes it possible for the tube connection to be formed in a freely bendable manner, which facilitates the installation of the valve arrangement.

According to a further advantageous refinement of the series, it may be provided that the first variant and the second variant are distinguished from one another by an adapter communicating between the main valve and the pilot valve, in particular wherein the adapter at least partially forms the pressure chamber.

The invention therefore relates to a valve arrangement having a main valve and having a pilot valve which is provided for controlling the main valve and which is inserted into a pilot valve receptacle in an insertion direction, wherein, through closure of the pilot valve, a pressure is able to be built up within a pressure chamber which is closed off by a diaphragm, whereby a valve seat between a main valve inlet and a main valve outlet is able to be closed off, wherein, through opening of the pilot valve, it is possible to set a release of pressure within the pressure chamber by way of flowing-away of the water via an inflow, connected to the pressure chamber, of the pilot valve receptacle and via a pilot valve inlet, adjoining said inflow and formed by a main body of the pilot valve, and via a pilot valve outlet, formed by the main body of the pilot valve, and via an outflow, adjoining said pilot valve outlet, into the main valve outlet, wherein the outflow opens into the main valve outlet on the outflow side of the diaphragm, wherein the pilot valve inlet and the pilot valve outlet are arranged offset from one another along a longitudinal axis of the pilot valve.

BRIEF DESCRIPTION OF THE DRAWINGS

The invention will now be discussed in more detail on the basis of several exemplary embodiments, but is not restricted to these exemplary embodiments. Further exemplary embodiments emerge from the combination of the features of individual or several claims and/or with individual or several features of the exemplary embodiments.

In the figures:

FIG. 12 shows a perspective illustration of a fourth embodiment of the valve arrangement according to the invention, with the pilot valve receptacle, with the pilot valve inserted therein, being arranged spaced apart from the main valve, FIG. 13 shows a longitudinal sectional illustration of the valve arrangement as per FIG. 12 in a side view, with the pilot valve being in a closed position, FIG. 14 shows a longitudinal sectional illustration of the valve arrangement as per FIGS. 12 and 13 in a side view, with the pilot valve being in an open position.

DETAILED DESCRIPTION

FIGS. 1 to 5 show a first exemplary embodiment of a valve arrangement according to the invention, which is denoted as a whole by 1.

Figure 1:
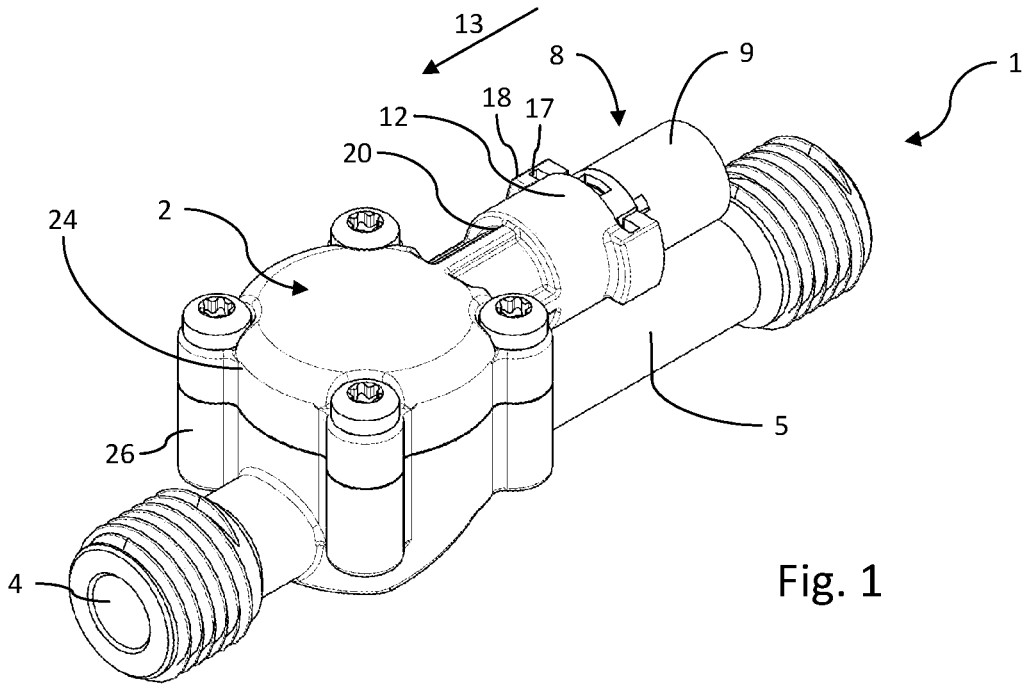
FIG. 1 shows a perspective illustration of a first embodiment of the valve arrangement according to the invention, with the adjustment direction of the main valve in this case being perpendicular to the adjustment direction of the pilot valve.
Figure 2:
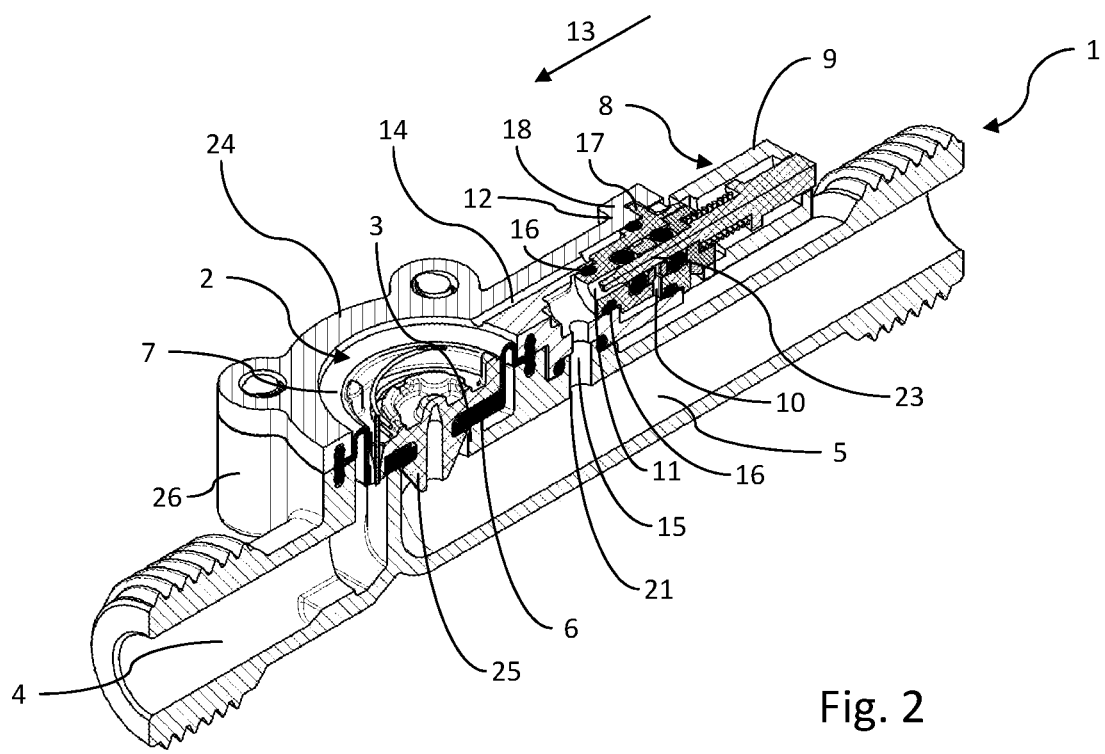
FIG. 2 shows a longitudinal section of the valve arrangement as per FIG. 1 in a perspective view.
Figure 3:
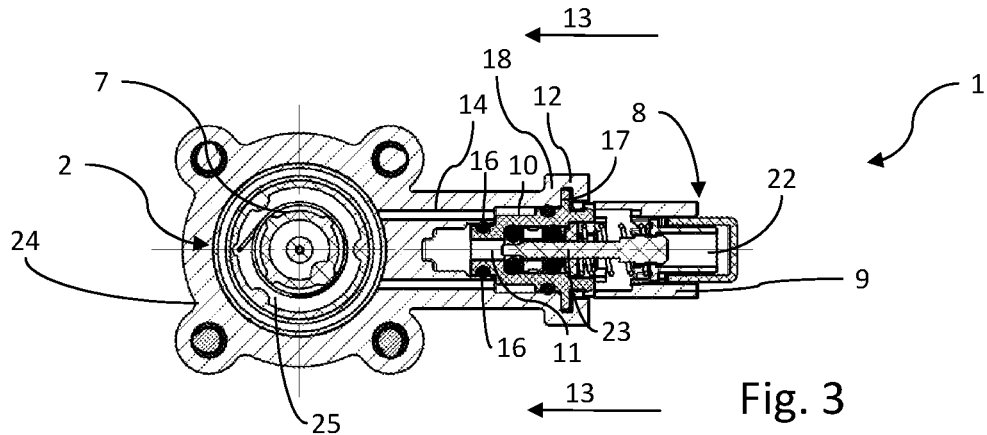
FIG. 3 shows a section through the housing of the main valve, and of the pilot valve, of the valve arrangement as per FIGS. 1 and 2 in a plan view.
Figure 4:
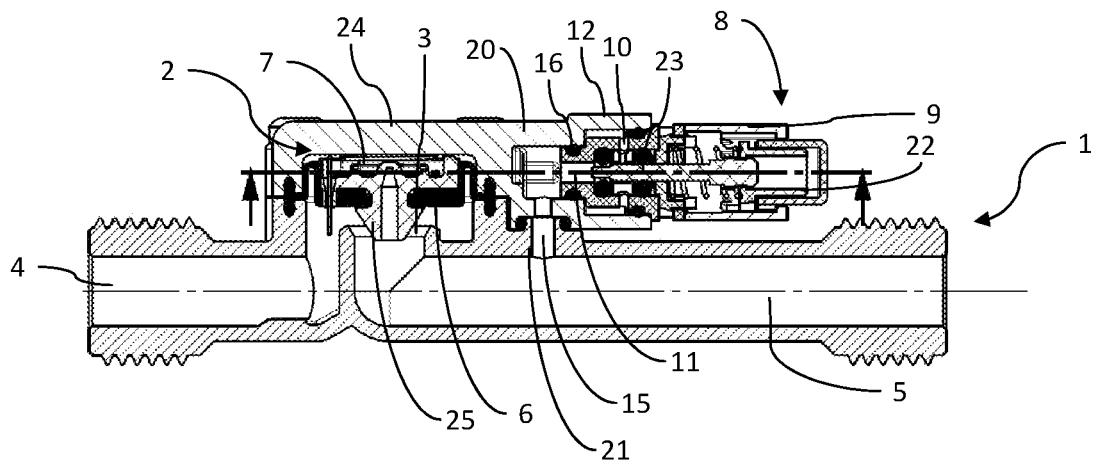
FIG. 4 shows a longitudinal sectional illustration of the valve arrangement as per FIGS. 1 to 3 in a side view, with the pilot valve being in an open position.
Figure 5:
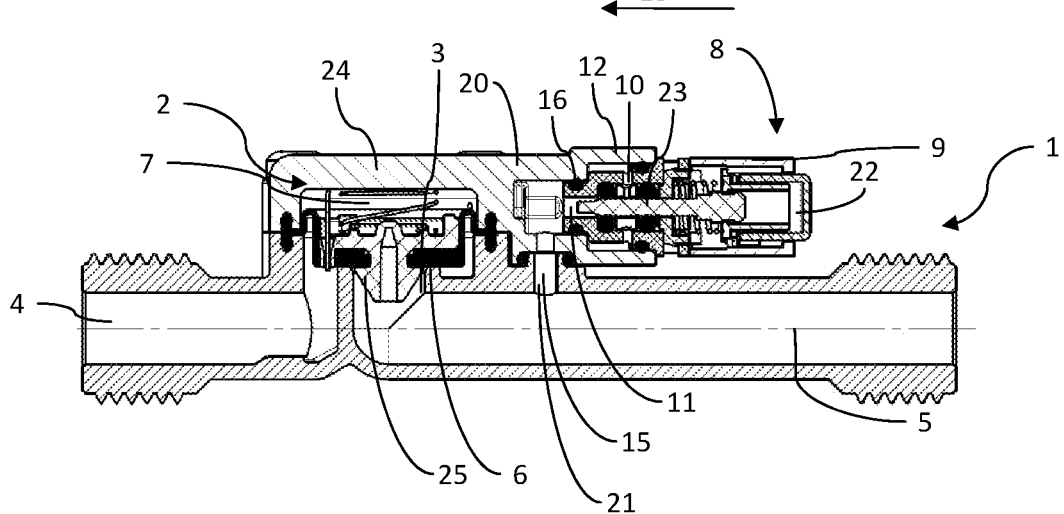
FIG. 5 shows a longitudinal sectional illustration of the valve arrangement as per FIGS. 1 to 4 in a side view, with the pilot valve being in a closed position.
Figure 6:
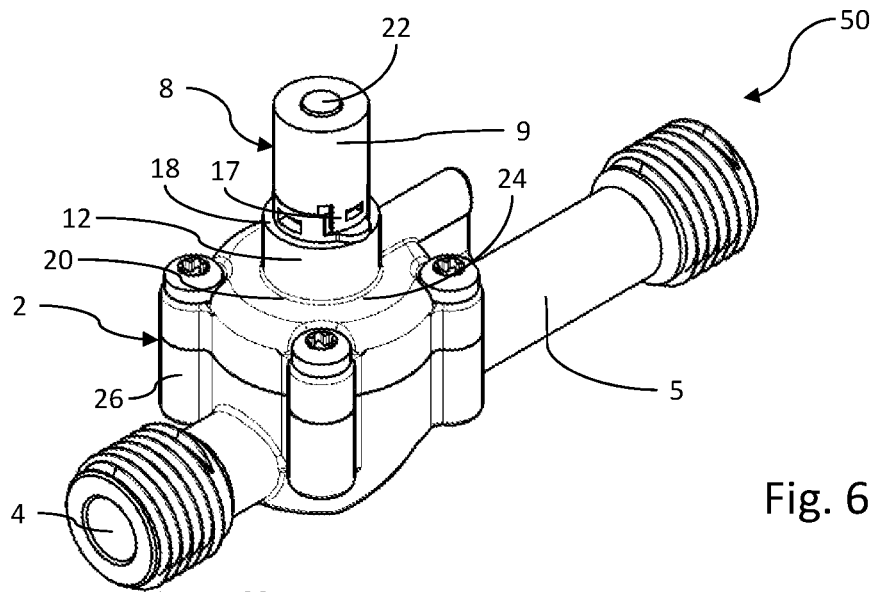
FIG. 6 shows a perspective illustration of a second embodiment of the valve arrangement according to the invention, with the adjustment direction of the main valve in this case being coaxial with the adjustment direction of the pilot valve.
Figure 7:
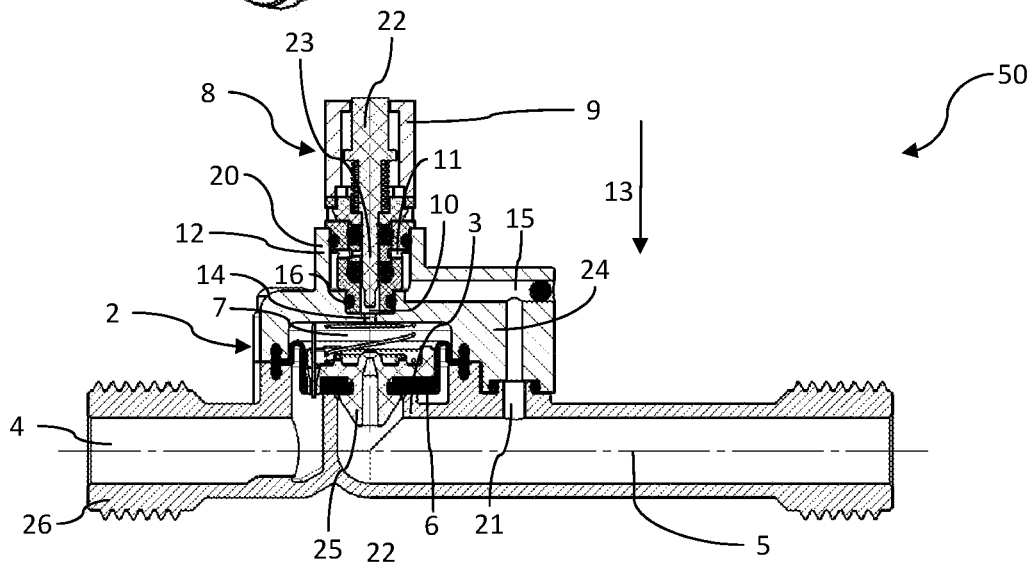
FIG. 7 shows a longitudinal sectional illustration of the valve arrangement as per FIG. 6 in a side view, with the pilot valve being in a closed position.
Figure 8:
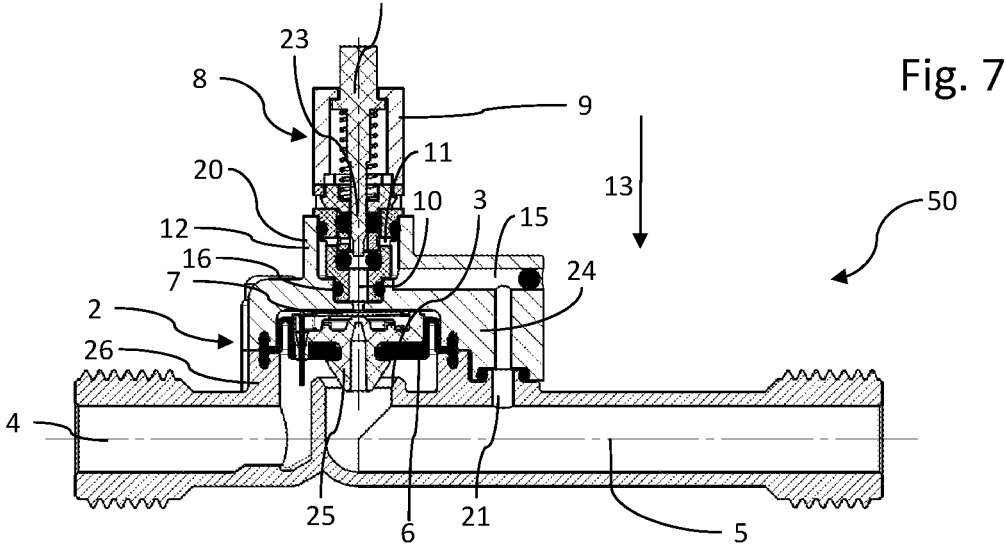
FIG. 8 shows a longitudinal sectional illustration of the valve arrangement as per FIGS. 6 and 7 in a side view, with the pilot valve being in an open position.

FIGS. 6 to 8 show a second exemplary embodiment of a valve arrangement according to the invention, which is denoted as a whole by 50.

Figure 9:
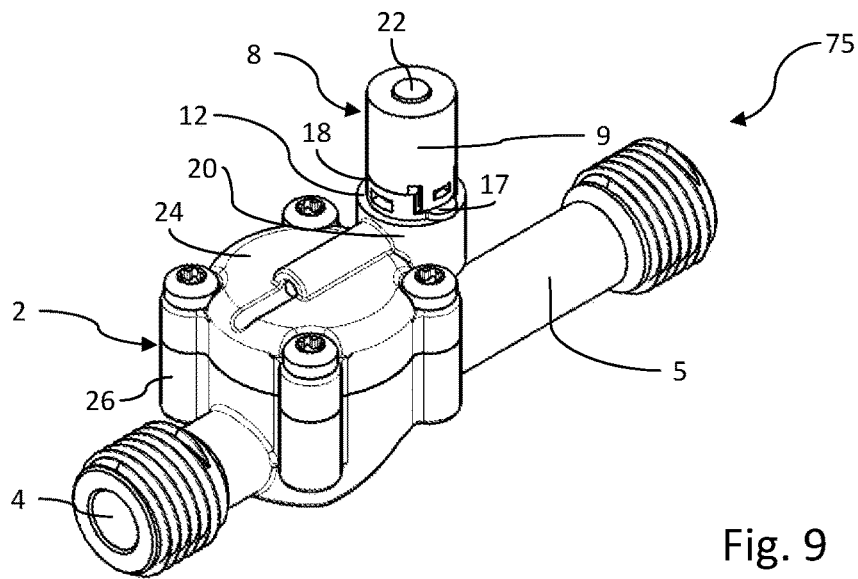
FIG. 9 shows a perspective illustration of a third embodiment of the valve arrangement according to the invention, with the adjustment direction of the main valve in this case being parallel to the adjustment direction of the pilot valve.
Figure 10:
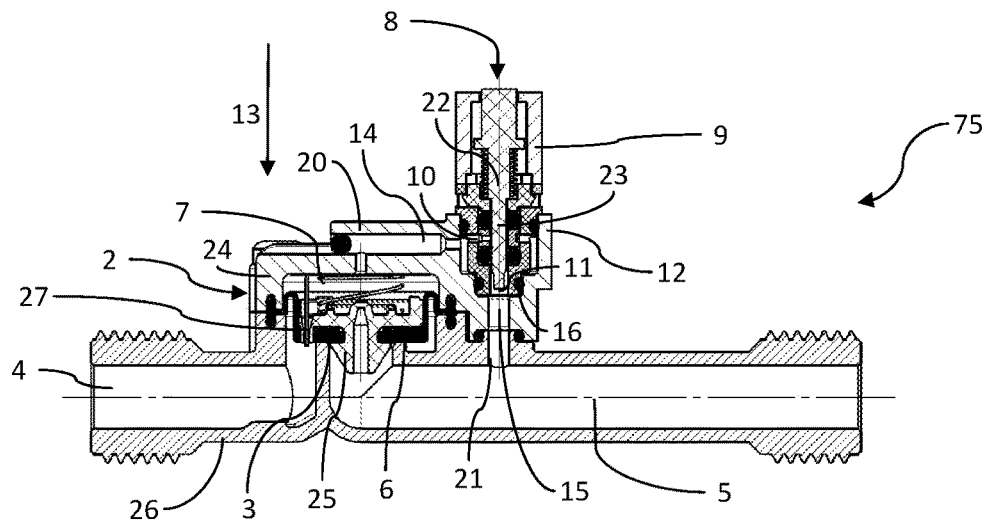
FIG. 10 shows a longitudinal sectional illustration of the valve arrangement as per FIG. 9 in a side view, with the pilot valve being in a closed position.
Figure 11:
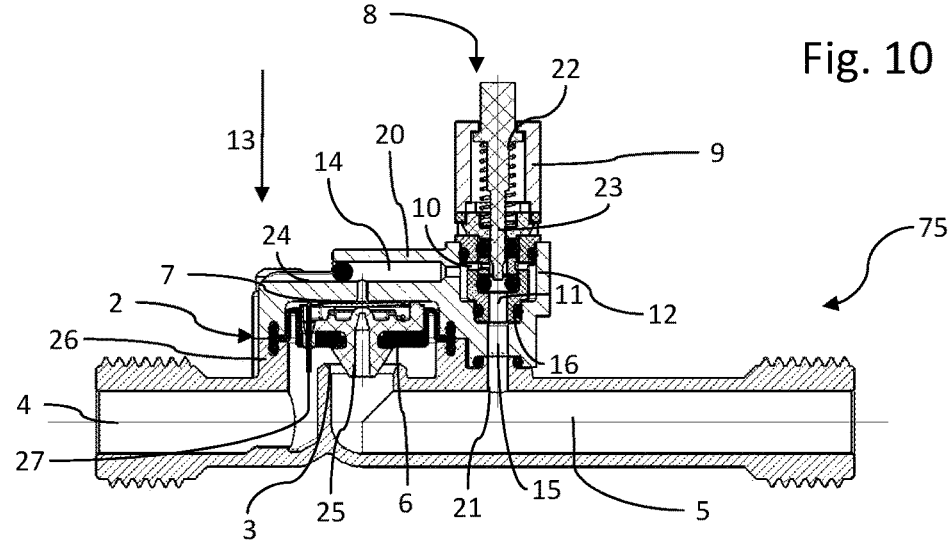
FIG. 11 shows a longitudinal sectional illustration of the valve arrangement as per FIGS. 9 and 10 in a side view, with the pilot valve being in an open position.

FIGS. 9 to 11 show a third exemplary embodiment of a valve arrangement according to the invention, which is denoted as a whole by 75.

FIGS. 12 to 14 show a fourth exemplary embodiment of a valve arrangement according to the invention, which is denoted as a whole by 100.

Further embodiments, which have not been represented on the basis of figures, are also conceivable, however.

The valve arrangement 1, 50, 75, 100 has in each case one main valve 2, which is arranged in a housing 26. The main valve 2 has a diaphragm 6, by which a pressure chamber 7 is closed off. By means of application of pressure to the diaphragm 6, the main valve 2 is able to be switched into a closed position. Here, water can flow into the pressure chamber 7 from a main valve inlet 4 via an inflow opening 27, whereby there is a build-up of a pressure within the pressure chamber 7 that pushes a valve body 25 into a valve seat 3, and thus water can no longer flow from the main valve inlet 4 into a main valve outlet 5 through the main valve 2.

The pilot valve 8 has a main body 9. A pilot valve inlet 10 and a pilot valve outlet 11 are formed on the main body 9 of the pilot valve 8. In an open position, that is to say also in a release position, of the pilot valve 8, water can flow from the pilot valve inlet 10 to the pilot valve outlet 11 by way of a flow path in the form of a duct. In a closed position of the pilot valve 8, it is not possible for the pilot valve 8 to be flowed through.

The main body 9 of the pilot valve 8 is inserted into a corresponding pilot valve receptacle 12 in an insertion direction 13. An inflow 14 is consequently formed on the pilot valve receptacle 12, which inflow is joined to the pilot valve inlet 10 of the pilot valve 8 and corresponds thereto. This results in the formation of a duct via which water can flow from the pilot valve receptacle 12 into the pilot valve 8. An outflow 15 is also formed on the pilot valve receptacle 12, which outflow is joined to the pilot valve outlet 10 of the pilot valve 8 and corresponds thereto. This results in the formation of a further duct, via which water can flow from the pilot valve 12 into the pilot valve receptacle 12.

The insertion direction 13 of the different embodiments of the valve arrangement 1, 50, 75, 100 varies, with this being defined by the respective orientation of the pilot valve receptacle relative to the main valve 2.

The pressure chamber 7 is connected to the inflow 14 of the pilot valve receptacle 12, in particular via a connection line.

The outflow 15 of the pilot valve receptacle 12 is connected to the main valve outlet 5, in particular via a connection line. Water flowing out of the pilot valve 8 consequently passes into the main valve outlet 5 via a mouth opening 21 in the wall of the main valve outlet 5.

As can be seen from the figures, the pilot valve receptacle 12 is of potshaped form, with the result that it has a likewise pot-shaped receiving space for receiving the pilot valve 8. A base delimits the pilot valve receptacle 12 in the insertion direction 13. As can also be seen, the pilot valve receptacle 12, in particular the receiving space, is designed to be at least half as deep as it is wide, preferably at least as deep as it is wide or even at least twice as deep as it is wide, in order in this way to be able to achieve secure lateral, in particular tilt-resistant, mounting of the pilot valve 8 in the pilot valve receptacle 12. The outflow 15 is formed at an inner end region of the pilot valve receptacle 12, in particular at an inner end region of the receiving space. The inflow 14 is formed in a lateral wall of the pilot valve receptacle 12, in particular at an inner end region of the receiving space.

The build-up of pressure within the pressure chamber 7 is able to be regulated via the pilot valve 8. Closure of the pilot valve 8 results in it not being possible for water to flow from the pressure chamber 7 through the pilot valve 8 via the inflow 14. Consequently, an internal pressure is built up within the pressure chamber 7. As a result of the build-up of pressure within the pressure chamber 7, the diaphragm is subjected to pressure and the main valve 2 is closed.

Opening of the pilot valve 8 results in the internal pressure within the pressure chamber 7 being reduced in that water flows out into the main valve outlet 5 via the inflow 14 and the outflow 15 and a release of pressure within the pressure chamber 7 is consequently established. In this way, the valve body 25 is pushed out of the valve seat 3, and water flows from the main valve inlet 5 into the main valve outlet 5 through the valve seat 3.

In order to achieve particularly effective sealing between the pilot valve receptacle 12 and the main body 9 of the pilot valve 8 without screwing or similar of the main body 9 on the pilot valve receptacle being necessary, the pilot valve inlet 10 and the pilot valve outlet 11 of the pilot valve 8, as shown in particular in FIGS. 15 to 19, are arranged offset from one another in the insertion direction 13. This constitutes a particularly reliable and, in comparison with technical solutions already known, nevertheless inexpensive coupling point of the pilot valve 8 and the pilot valve receptacle 12. Furthermore, the pilot valve inlet 10 and the pilot valve outlet 11 are arranged spaced apart from one another in the insertion direction 13, this likewise also emerging from FIGS. 15 to 19.

The pilot valve inlet 10 is formed on the main body as a duct extending radially sectionally, at least in the mouth region, and the pilot valve outlet 11 is formed on the main body as a duct extending axially sectionally, at least in the mouth region. In the case of water flowing through the pilot valve 8, it is thus possible for a release of pressure of a holding means, by which the pilot valve is held in the pilot valve receptacle, to be achieved. The holding means may be formed by a fastening means 17 and a mating fastening means 18.

For the formation of a seal, between the pilot valve inlet 10 and the pilot valve outlet 11, there is arranged a seal ring 16 which acts transversely to the insertion direction 13 and by which a radial seal between the main body 9 and a wall of the pilot valve receptacle 12 is formed. The flow path, in the form of a duct, within the pilot valve 8 between the pilot valve inlet 10 and the pilot valve outlet 11 is sealed off via a further sealing element 28, preferably a sealing element 28 in the form of a seal ring, in the closure position of the pilot valve 8.

In the first embodiment of the valve arrangement 1, which is shown in FIGS. 1 to 5, the inflow 14 is oriented parallel to the insertion direction 13. By contrast, the outflow 15 is arranged transverse, in particular at a right angle, to the insertion direction 13. In this embodiment of the valve arrangement 1, the pilot valve receptacle 12 is formed by a housing part 20 of the main valve 2. The insertion direction 13 and the adjustment direction of the main valve 2 are likewise oriented transverse, in particular perpendicular, to one another. The insertion direction 13 is in this case parallel to a longitudinal axis of the main valve outlet 5. The valve arrangement 1 thus constitutes a particularly space-saving configuration. A connection between the inflow 14 and the pressure chamber 7 and a connection between the outflow 15 and the main valve outlet 5 is in each case realized via a connection duct formed in the housing part 20.

In the second embodiment of the valve arrangement 50, which is shown in FIGS. 6 to 8, the inflow 14 is likewise arranged parallel to the insertion direction 13. By contrast, the outflow 15 is arranged transverse, in particular at a right angle, to the insertion direction 13. By contrast to the above-stated embodiment, the pilot valve 8 is arranged at an angle to the main valve outlet 5 such that the insertion direction 13 is transverse, in particular perpendicular, to the longitudinal axis of the main valve outlet 5. The main valve 2 and the pilot valve 8 are arranged such that the adjustment directions thereof are parallel to, in particular coaxial with, and/or along the insertion direction 13. In this embodiment of the valve arrangement 50, the pilot valve receptacle 12 is likewise formed by a housing part 20 of the main valve 2. A connection between the inflow 14 and the pressure chamber 7 and a connection between the outflow 15 and the main valve outlet 5 is in each case realized via a connection duct formed in the housing part 20.

In the third embodiment of the valve arrangement 75, which is shown in FIGS. 9 to 11, the inflow 14 is arranged transverse, in particular perpendicular, to the insertion direction 13. The outflow 15 is arranged parallel to the insertion direction 13. As in the case of the above-stated embodiment, the pilot valve 8 is arranged at an angle to the main valve outlet 5 such that the insertion direction 13 is transverse, in particular perpendicular, to the longitudinal axis of the main valve outlet 5. The main valve 2 and the pilot valve 8 are arranged such that the adjustment directions thereof are parallel to and/or along the insertion direction 13. In this embodiment of the valve arrangement 50, the pilot valve receptacle 12 is likewise formed by a housing part 20 of the main valve 2. A connection between the inflow 14 and the pressure chamber 7 and a connection between the outflow 15 and the main valve outlet 5 is in each case realized via a connection duct formed in the housing part 20.

The fourth embodiment of the valve arrangement 100, which is shown in FIGS. 12 to 14, has the special feature that a connection between the inflow 14 and the pressure chamber 7 and a connection between the outflow 15 and the main valve outlet 5 is in each case realized via a tube connection 19. This has the advantage that the pilot valve receptacle 12 and the pilot valve 8 are able to be positioned more or less freely relative to the main valve 2, since the pilot valve receptacle 12 is not formed by a housing part 20 of the housing 26 of the main valve 2. This is because the pilot valve receptacle 12 is designed as a separate element and is therefore able to be placed spaced apart from the main valve. In the fourth embodiment of the valve arrangement 100, the inflow 14 is arranged transverse, in particular perpendicular, to the insertion direction 13. The outflow 15 is arranged parallel to the insertion direction 13.

In order to make it possible for the pilot valve 8 and the pilot valve receptacle 12 to be coupled in a manner releasable without tools, the valve arrangement 1, 50, 75, 100 has a fastening means 17 on the main body 9 and a mating fastening means 18 on the pilot valve receptacle 12. By way of the fastening means 17 and the mating fastening means 18, a lockable and releasable connection is formed. As can be clearly seen particularly in FIG. 16, the valve arrangement 1, 50, 75, 100 has a plug-and-turn connection, by which a simple, stable and releasable coupling of the pilot valve 8 and the pilot valve receptacle 12 is possible. Preferably, the plug-and-turn connection may be in the form of a bayonet connection.

The mouth opening 21 of the outflow 15 into the main valve outlet 5 is arranged spaced apart from the diaphragm 6. This makes it possible to avoid unwanted feedback on the diaphragm 6 and associated malfunctioning with the closing and opening of the main valve 2.

The pilot valve 8 is able to be adjusted between a closed position and an open position by hand. For this purpose, the pilot valve 8 has a pushbutton mechanism 22, known per se, via which a valve plunger 23 is able to be adjusted along the adjustment direction of the pilot valve 8. The valve plunger allows the flow path between the pilot valve inlet 10 and the pilot valve outlet 12 to be selectively closed off or opened up.

In a further embodiment of the valve arrangement 1, 50, 75, 100, which is not represented on the basis of the figures, it may be provided that the pilot valve is in the form of a pinch valve. A pinch valve makes it possible to achieve an optimum shut-off, with the production costs being relatively low.

In all the embodiments of the valve arrangement 1, 50, 75, 100, the pilot valves 8 are of structurally identical design. This allows the pilot valve 8 to be usable regardless of the desired embodiment.

Figures 15, 16:
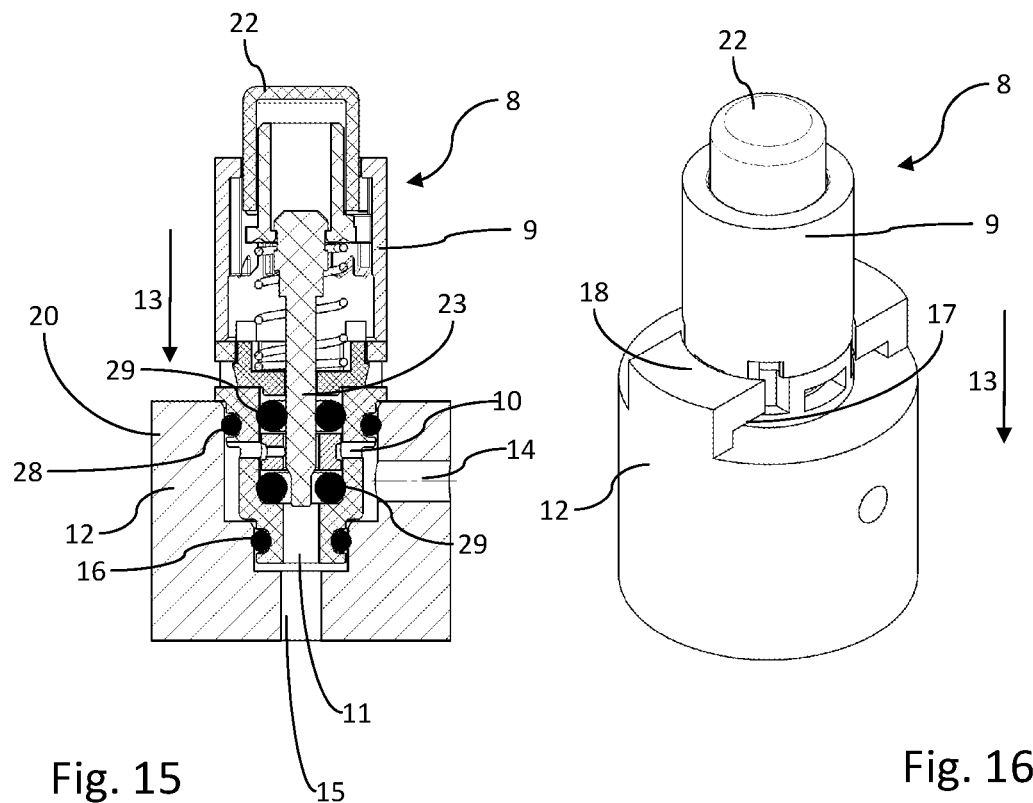
FIG. 15 shows a sectional view of a longitudinal section through a pilot valve receptacle, with pilot valve inserted therein.
FIG. 16 shows a perspective illustration of the pilot valve receptacle, with the pilot valve inserted therein, from FIG. 15.

FIGS. 15 and 16 show a possible configuration of a pilot valve 8 which is inserted into a pilot valve receptacle 12 and is locked therein.

Figures 17, 18, 19:
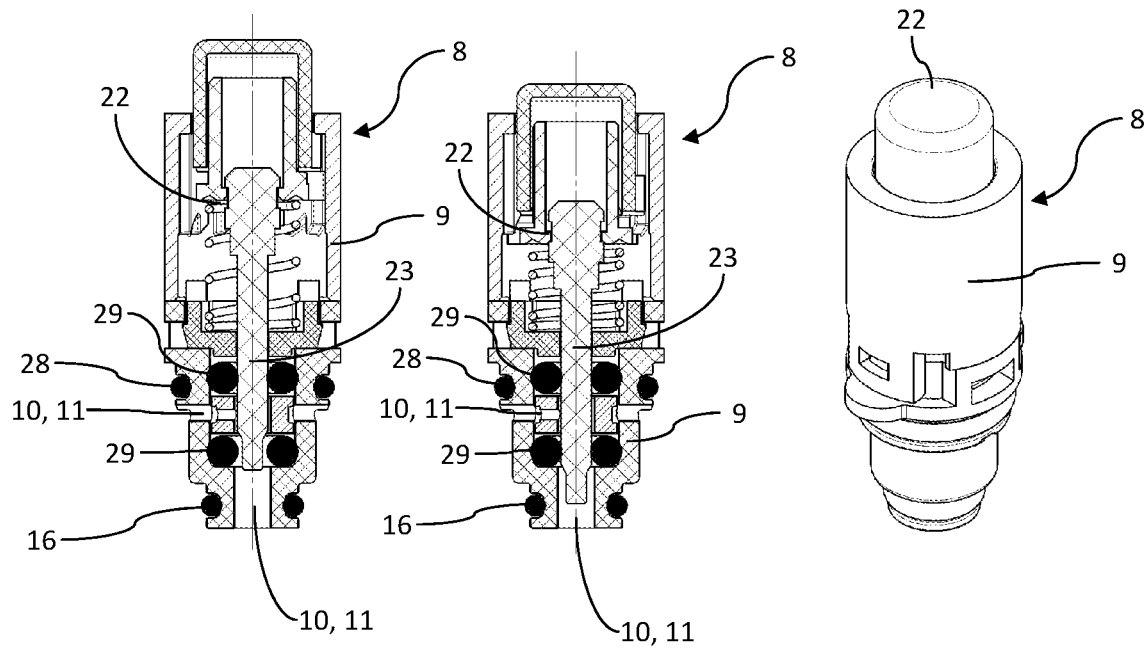
FIG. 17 shows a sectional view of a longitudinal section through a pilot valve of an embodiment of the valve arrangement according to the invention, with the pilot valve being shown in an open position.
FIG. 18 shows a sectional view of a longitudinal section through a pilot valve of an embodiment of the valve arrangement according to the invention, with the pilot valve being shown in a closed position.
FIG. 19 shows a perspective view of the pilot valve from FIGS. 17 and 18, with the pilot valve being shown in an open position.

The structurally identical pilot valve 8 is illustrated once again in FIGS. 17 to 19, with the pilot valve 8 being shown in the open position in FIG. 17 and in the closed position in FIG. 18.

As can be seen from FIGS. 15, 17 and 18, the pilot valve 8 has two opening ducts, which are able to be used selectively as the pilot valve inlet 10 or as the pilot valve outlet 11. Whether the respective opening duct 10, 11 acts as the pilot valve inlet 10 or as the pilot valve outlet 11 depends on the throughflow direction of the water through the pilot valve 8. Therefore, no structural changes to the pilot valve 8 are necessary for making it possible for the pilot valve 8 to be used for different throughflow directions. In general, it may consequently be said that the pilot valve 8 has a freely selectable throughflow direction. An inflow direction of the pilot valve inlet 10 is arranged rotated through an angle, in particular through a right angle, with respect to the outflow direction of the pilot valve outlet 11. It is preferably the case, however, that the pilot valve outlet 11 is formed on the main body 9 axially with respect to a longitudinal axis of the main body 9 and the pilot valve inlet 10 is formed on the main body 9 radially with respect to a longitudinal axis of the main body 9. This makes it possible for a release of pressure to be provided at the coupling point of the pilot valve 8 and the pilot valve receptacle 12.

In order to be able to achieve particularly effective sealing of the intermediate space between the main body 9 and the pilot valve receptacle 12, at least one further sealing element 28, in particular a seal ring, is arranged between the main body 9 and the pilot valve receptacle 12. Here, the sealing element 28 may be arranged between the pushbutton mechanism 22 and the pilot valve inlet 10. It is thus possible to prevent for example damage to the pushbutton mechanism 22 caused by water due to leakage.

The pilot valve 8 furthermore has, for sealing an intermediate space between the valve plunger 23 and the main body 9, at least one inner sealing element 29, which, between the pilot valve inlet 10 and the pilot valve outlet 11, acts transversely, in particular perpendicularly, to the insertion direction 13. In particular, the at least one inner sealing element 29 may be designed as a seal ring 29, with the valve plunger 23 being guided displaceably within the annular opening of the seal ring.

The pilot valve 8 may have a further inner sealing element 29, which is arranged between the valve plunger 23 and the main body 9, and between the pushbutton mechanism 22 and the pilot valve inlet 10. In particular, the further inner sealing element 29 may be designed as a seal ring, with the valve plunger 23 being guided displaceably within the annular opening of the seal ring.

The housing part 20 of the main valve may be designed as an adapter 24 which is able to be removed in particular from the remainder of the housing 26. The pressure chamber 7 is partly formed by the adapter 24.

Figure 20:
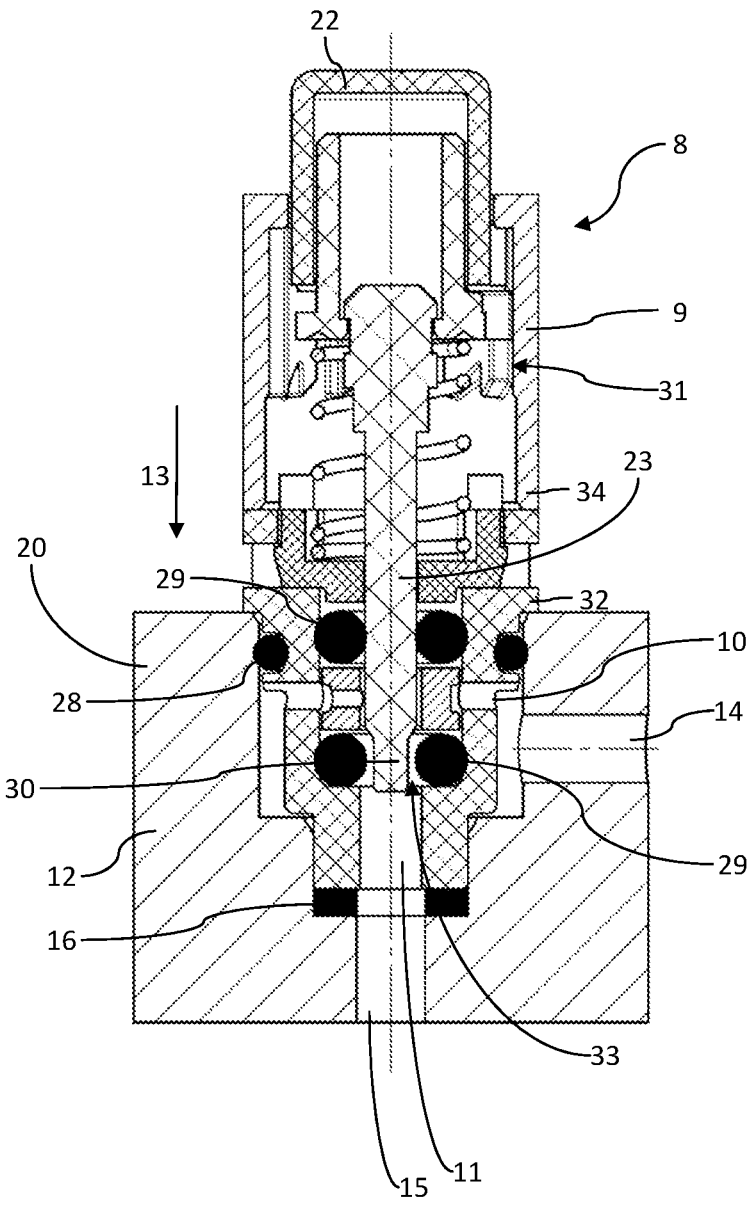
FIG. 20 shows an axial cross-section of another embodiment according to the invention.

FIG. 20 shows an axial cross-section of another embodiment ac-cording to the invention. Parts or elements that are identical or similar to those of the preceding embodiments are denoted with corresponding reference numerals; Explanations given for the preceding embodiments are valid for this embodiment, too.

The embodiment according to FIG. 20 deviates from the preceding embodiments in that the sealing element 16 is an axial seal, i.e. it is to be compressed in the axial direction to yield a sealing effect.

In addition, it can be seen from FIG. 20 and the preceding embodiments, that the pilot valve 8 further includes a valve plunger 23 that is operatively connected to a push-push-mechanism 31.

The sealings 29 are each of an elastically deformable material. One sealing 29 is arranged between the pilot valve inlet 10 and the pilot valve outlet, another sealing 29 is arranged between the pilot valve inlet 10 a valve seat (33) of the pi-lot valve 8.

The latter sealing 29 is, at least in a closed state of the pilot valve 8, in sealing cooperation with the valve plunger 23.

A main body of the pilot valve 8 is comprised of at least two parts 32, 34 that are attached to each other. A valve part 32 contains a valve seat 33 of the pilot valve 8 and is sealingly connected to the pilot valve receptacle 12.

An actuation part 34 contains a pushbutton mechanism 22 in the form of a push-push mechanism 31.

In an open state of the pilot valve 8, the (lower) sealing 29 is spaced apart from the valve plunger 23. To achieve this, a distal end section 30 of the valve plunger 23 is smaller in diameter then the (lower) sealing 29.

LIST OF REFERENCE SIGNS

1 Valve arrangement
50 Valve arrangement
75 Valve arrangement
100 Valve arrangement
2 Main valve
3 Valve seat
4 Main valve inlet
5 Main valve outlet
6 Diaphragm
7 Pressure chamber
8 Pilot valve
9 Main body
10 Pilot valve inlet
11 Pilot valve outlet
12 Pilot valve receptacle
13 Insertion direction
14 Inflow
15 Outflow
16 Sealing element
17 Fastening means
18 Mating fastening means
19 Tube connection
20 Housing part of the main valve
21 Mouth opening
22 Pushbutton mechanism
23 Valve plunger of the pilot valve
24 Adapter
25 Valve body
26 Valve housing
27 Inflow opening
28 Further sealing element
29 Inner sealing element
30 Distal end section
31 Push-push mechanism
32 Valve part
33 Valve seat
34 Actuation part

The invention claimed is:

1. A valve arrangement (1, 50, 75, 100), comprising:
    a main valve (2) comprising a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;

a pilot valve receptacle formed on or connected to the main valve housing a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and a fastener formed on the main body (9) and a mating fastener is formed on the pilot valve receptacle (12), and the fastener and mating fastener form a lockable and releasable connection, wherein the connection is a ¼ turn connection;

wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);

wherein the pilot valve inlet (10) and the pilot valve outlet (11) are arranged offset from one another at least in the insertion direction (13);

a sealing element (16) is arranged, in an assembled state, insertable with the pilot valve in, and acting at least partially along, the insertion direction (13), and the sealing element (16) forms an axial seal between the main body (9) and the pilot valve receptacle (12).

2. The valve arrangement (1, 50, 75, 100) as claimed in claim 1, wherein at least one of the inflow (14) or the outflow (15) is oriented transverse to the insertion direction (13), or at least one of the pilot valve inlet (10) or the pilot valve outlet (11) is oriented transverse to the insertion direction (13).

3. The valve arrangement (1, 50, 75, 100) as claimed in claim 1, wherein at least one of the connection between the inflow (14) and the pressure chamber (7) or the connection between the outflow (15) and the main valve outlet (5) comprises a tube connection (19).

4. The valve arrangement (1, 50, 75, 100) as claimed in claim 1, wherein at least one of the pilot valve inlet (10) and the pilot valve outlet (11) are arranged spaced apart from one another in the insertion direction (13), the pilot valve inlet (10) is formed on the main body (9) as a duct extending radially at least sectionally, or the pilot valve outlet (11) is formed on the main body (9) as a duct extending axially at least sectionally.

5. The valve arrangement (1, 50, 75, 100) as claimed in claim 1, wherein at least one of the pilot valve receptacle (12) is formed in a housing part (20) of the main valve (2), or the pilot valve receptacle (12) is pot-shaped and is at least half as deep as it is wide.

6. The valve arrangement (1, 50, 75, 100) as claimed in claim 1, wherein the outflow (15) is formed at an inner end region of the pilot valve receptacle (12), or a mouth opening (21) of the connection between the outflow (15) and the main valve outlet (5) is arranged spaced apart from the diaphragm (6) of the main valve (2).

7. The valve arrangement (1, 50, 75, 100) as claimed in claim 1, wherein the pilot valve (8) is manually actuatable.

8. The valve arrangement (1, 50, 75, 100) as claimed in claim 1, wherein the pilot valve (8) further includes at least one of a pushbutton mechanism (22), a rocker switch, or a rotary switch for actuation.

9. The valve arrangement (1, 50, 75, 100) as claimed in claim 1, wherein the pilot valve (8) further includes a valve plunger (23).

10. The valve arrangement (1, 50, 75, 100) as claimed in claim 1, wherein the pilot valve (8) is fastened releasably in the pilot valve receptacle (12).

11. A series of valve arrangements (1, 50, 75, 100) having at least two variants, each comprising one of the valve arrangements (1, 50, 75, 100) as claimed in claim 1, wherein the pilot valves (8) of the at least two variants are structurally identical, and in a first variant of the at least two variants, the pilot valve (8) is arranged in the pilot valve receptacle (2) that is formed on a housing part (20) of the main valve (2) and, in a second variant of the at least two variants, the pilot valve (8) is at least one of arranged in a position, or with an orientation, which differs in relation to the respective main valve (2).

12. The series of valve arrangements as claimed in claim 11, wherein in the second variant of the at least two variants, the pilot valve (8) is arranged in the pilot valve receptacle (12) that is separate from the main valve (2).

13. The series of valve arrangements as claimed in claim 11, wherein in the second variant, the pilot valve (8) is connected to the main valve (2) via at least one tube connection (19).

14. The series of valve arrangements as claimed in claim 11, wherein the first variant and the second variant are distinguished from one another by an adapter (24) communicating between the main valve (2) and the pilot valve (8).

15. A valve arrangement (1, 50, 75, 100), comprising:

a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;

a pilot valve receptacle (12) formed on or connected to the main valve housing (20)

a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and a fastener formed on the main body (9) and a mating fastener is formed on the pilot valve receptacle (12), and the fastener and mating fastener form a lockable and releasable connection, wherein the connection is a ¼ turn connection;

wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);

wherein the pilot valve inlet (10) and the pilot valve outlet (11) are arranged offset from one another at least in the insertion direction (13);

wherein the pilot valve (8) further includes a valve plunger (23);

and at least one of (a) a seal (29) of an elastically deformable material arranged between the pilot valve inlet (10) and at least one of the pilot valve outlet (11) or a valve seat (33) of the pilot valve (8), or (b) a seal, at least in a closed state of the pilot valve (8), in sealing cooperation with the valve plunger (23).

16. A valve arrangement (1, 50, 75, 100), comprising:
    a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;
    a pilot valve receptacle (12) formed on or connected to the main valve housing (20)
    a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13);
    wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);
    wherein the pilot valve inlet (10) and the pilot valve outlet (11) are arranged offset from one another at least in the insertion direction (13);
    wherein the pilot valve (8) further includes a valve plunger (23);
    and at least one of (a) a seal (29) of an elastically deformable material arranged between the pilot valve inlet (10) and at least one of the pilot valve outlet (11) or a valve seat (33) of the pilot valve (8), or (b) a seal, at least in a closed state of the pilot valve (8), in sealing cooperation with the valve plunger (23) and
        wherein, in an open state of the pilot valve (8), the sealing (29) is spaced apart from the valve plunger (23), wherein a distal end section (30) of the valve plunger (23) is smaller in diameter then the sealing (29).

17. A valve arrangement (1, 50, 75, 100), comprising:
    a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;
    a pilot valve receptacle (12) formed on or connected to the main valve housing (20)
    a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and
    a fastener formed on the main body (9) and a mating fastener is formed on the pilot valve receptacle (12), and the fastener and mating fastener form a lockable and releasable connection, wherein the connection is a ¼ turn connection
    wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);
    wherein the pilot valve inlet (10) and the pilot valve outlet (11) are arranged offset from one another at least in the insertion direction (13); and
    wherein the pilot valve (8) further includes a valve plunger (23) that is in sliding or fixed contact with a sealing element (29) that seals the pilot valve (8).

18. A valve arrangement (1, 50, 75, 100), comprising:
    a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;
    a pilot valve receptacle (12) formed on or connected to the main valve housing (20)
    a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and
    a fastener formed on the main body (9) and a mating fastener is formed on the pilot valve receptacle (12), and the fastener and mating fastener form a lockable and releasable connection, wherein the connection is a ¼ turn connection;
    wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);
    wherein the pilot valve inlet (10) and the pilot valve outlet (11) are arranged offset from one another at least in the insertion direction (13); and
    wherein the pilot valve (8) further includes a valve plunger (23) that has a distal end section (30) of reduced diameter.

19. A valve arrangement (1, 50, 75, 100), comprising:
    a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;
    a pilot valve receptacle (12) formed on or connected to the main valve housing (20)

a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and a fastener formed on the main body (9) and a mating fastener is formed on the pilot valve receptacle (12), and the fastener and mating fastener form a lockable and releasable connection, wherein the connection is a ¼ turn connection;

wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);

wherein the pilot valve inlet (10) and the pilot valve outlet (11) are arranged offset from one another at least in the insertion direction (13); and wherein the pilot valve (8) further includes a valve plunger (23) that is operatively connected to a push-push-mechanism (31).

20. A valve arrangement (1, 50, 75, 100), comprising:

a main valve (2) including a housing (20), a valve seat (3) between a main valve inlet (4) and a main valve outlet (5), a diaphragm (6) which selectively closes off and opens up the valve seat (3), and a pressure chamber (7) which is closed off by the diaphragm (6) and by which the diaphragm (6) is switchable via application of pressure;

a pilot valve receptacle (12) formed on or connected to the main valve housing (20)

a pilot valve (8) configured to control a release of pressure of the pressure chamber (7) into the main valve outlet (5) of the main valve (2), the pilot valve (8) including a main body (9) on which a pilot valve inlet (10) and a pilot valve outlet (11) are formed, the pilot valve inlet (10) is, via the pilot valve (8), selectively connectable to the pilot valve outlet (11) and separable therefrom, and the main body (9) is inserted into the pilot valve receptacle (12) in an insertion direction (13); and a fastener formed on the main body (9) and a mating fastener is formed on the pilot valve receptacle (12), and the fastener and mating fastener form a lockable and releasable connection, wherein the connection is a ¼ turn connection wherein the pilot valve receptacle (12) has an inflow (14) corresponding to the pilot valve inlet (10) and has an outflow (15) corresponding to the pilot valve outlet (11), the inflow (14) is connected to the pressure chamber (7) and the outflow (15) opens into the main valve outlet (5) on the outflow side of the diaphragm (6);

wherein the pilot valve inlet (10) and the pilot valve outlet (11) are arranged offset from one another at least in the insertion direction (13); and wherein a main body of the pilot valve (8) is comprised of at least a valve part and an actuation part (32, 34) that are attached to each other, and the valve part (32) at least one of: contains a valve seat (33) of the pilot valve (8) or is sealingly connected to the pilot valve receptacle (12) or the actuation part (34) contains a pushbutton mechanism (22).

* * * * *